United States Patent [19]
Kawagoe et al.

[11] Patent Number: 5,587,091
[45] Date of Patent: Dec. 24, 1996

[54] METHOD AND APPARATUS FOR CONTROLLING RESISTANCE WELDING

[75] Inventors: Tadashi Kawagoe, Hekinan; Keizo Zyouko, Okazaki, both of Japan

[73] Assignee: Nippondenso Co., Ltd., Kariya, Japan

[21] Appl. No.: 426,979

[22] Filed: Apr. 20, 1995

[30] Foreign Application Priority Data

Apr. 20, 1994 [JP] Japan .................................. 6-081651

[51] Int. Cl.$^6$ .................................................. B23K 11/24
[52] U.S. Cl. ........................................ 219/110; 219/91.21
[58] Field of Search ................................ 219/110, 86.41, 219/91.21

[56] References Cited

U.S. PATENT DOCUMENTS

| 3,400,242 | 9/1968 | Waller | 219/110 |
| 3,404,252 | 10/1968 | Michael | 219/110 |
| 3,538,293 | 11/1970 | Procacino | 219/110 |
| 4,317,980 | 3/1982 | Goodrich et al. | 219/110 |
| 4,634,828 | 1/1987 | Okabe et al. | |
| 5,308,948 | 5/1994 | Kawagoe et al. | |
| 5,484,976 | 1/1996 | Sbalchiero et al. | 219/110 |

FOREIGN PATENT DOCUMENTS

| 38585 | 1/1991 | Japan . |
| 5337655 | 12/1993 | Japan . |
| 5337657 | 12/1993 | Japan . |

Primary Examiner—Clifford C. Shaw
Attorney, Agent, or Firm—Cushman Darby & Cushman IP Group of Pillsbury Madison & Sutro LLP

[57] ABSTRACT

A control apparatus for resistance welding includes a time measuring device for measuring an energization time of a welding current, the energization time being required by a given electrode displacement during welding between an electrical conductive weld member and a member to be welded which are arranged between two electrodes. A time difference calculating device is operative for calculating a time difference between the energization time measured by the time measuring device and a preset target energization time. A feedback control device is operative for correctively increasing and decreasing a welding current, which occurs at a next weld timing, on the basis of the time difference calculated by the time difference calculating device.

6 Claims, 8 Drawing Sheets

| RANK NO. | WELDING CURRENT VALUE [A] |
|---|---|
| 1 | 2100 |
| 2 | 2120 |
| 3 | 2140 |
| 4 | 2160 |
| 5 | 2180 |
| 6 | 2200 |
| 7 | 2220 |
| 8 | 2240 |
| 9 | 2260 |
| 10 | 2280 |
| 11 | 2300 |
| 12 | 2320 |
| 13 | 2340 |
| 14 | 2360 |
| 15 | 2380 |

METHOD AND APPARATUS FOR CONTROLLING RESISTANCE WELDING

BACKGROUND OF THE INVENTION

1. Field of the Invention

This invention relates to an apparatus for controlling resistance welding. This invention also relates to a method of controlling resistance welding.

2. Description of the Prior Art

U.S. Pat. No. 4,634,828 discloses a control method related to resistance welding in which welding conditions such as a welding current and a welding time are controlled in response to a change in material of weldments. The method in U.S. Pat. No. 4,634,828 has the step of detecting the local lowest value of resistance between electrode tips which appears in an initial welding period, the step of comparing the detected lowest value with a plurality of reference resistance values to determine the material of a weldment under process, and the step of changing the welding conditions (such as the welding current and the welding time) depending on the determined material. The reference resistance values are preset correspondingly to materials of weldments of different sorts, and are divided into plural classes.

Japanese published unexamined patent application 5-337655 discloses a method and a device for controlling a welding current in a resistance welding apparatus. The device in Japanese application 5-337655 includes a CPU which outputs a command value of the welding current of a square waveform according to initial data stored in a storage circuit. A secondary side current detector informs the CPU of the actual welding current energized between electrode tips. The CPU commands an arithmetic circuit to calculate a limiting current value from the actual welding current. The limiting current value relates to the generation of expulsion and surface flash. A specified energizing pattern is selected based on the limiting current value from among plural energizing patterns of a stepped waveform. The command value of the welding current is outputted in accordance with the selected energizing pattern. The presence or the absence of expulsion and surface flash is detected, and one of the energizing patterns is reselected based on the detection result.

Japanese published unexamined patent application 5-337657 discloses a resistance welding controller including a detection segment for detecting at least one physical quantity on a part to be welded, and an arithmetic segment for carrying out numerical analysis of the energizing diameter and the nugget diameter in response to the detected physical quantity. The resistance welding controller in Japanese application 5-337657 also includes a comparison segment for comparing the physical quantity with a model waveform or comparing a nugget-diameter model waveform with the nugget diameter estimated by the arithmetic segment, and for outputting the comparison result as a control signal. At least one of a welding current, a welding time, and a welding force is changed in response to the control signal outputted by the comparison segment and the energizing diameter outputted by the arithmetic segment.

Japanese published unexamined patent application 3-8585 discloses feedback control in resistance welding. According to the feedback control in Japanese application 3-8585, a resistance value is calculated from a welding current and a welding voltage applied between electrodes, and the resistance value is compared with a model resistance value. The welding current is controlled in response to the comparison result to stabilize welding conditions.

SUMMARY OF THE INVENTION

It is a first object of this invention to provide an improved apparatus for controlling resistance welding.

It is a second object of this invention to provide an improved method of controlling resistance welding.

A first aspect of this invention provides a control apparatus for resistance welding which comprises time measuring means for measuring an energization time of a welding current, the energization time being required by a given electrode displacement during welding between an electrical conductive weld member and a member to be welded which are arranged between two electrodes; time difference calculating means for calculating a time difference between the energization time measured by the time measuring means and a preset target energization time; and feedback control means for correctively increasing and decreasing a welding current, which occurs at a next weld timing, on the basis of the time difference calculated by the time difference calculating means.

A second aspect of this invention provides a method of controlling resistance welding which comprises a time measuring step of measuring an energization time of a welding current, the energization time being required by a given electrode displacement during welding between an electrical conductive weld member and a member to be welded which are arranged between two electrodes; a time difference calculating step of calculating a time difference between the energization time-measured by the time measuring step and a preset target energization time; and a feedback control step of correctively increasing and decreasing a welding current, which occurs at a next weld timing, on the basis of the time difference calculated by the time difference calculating step.

A third aspect of this invention provides a control apparatus for resistance welding which comprises time measuring means for measuring an energization time of a welding current, the energization time being required by a given electrode displacement during welding between a terminal and a coated electric wire which are arranged between two electrodes, the terminal containing copper, the coated electric wire having an electric conductor coated with a film of resin; time difference calculating means for calculating a time difference between the energization time measured by the time measuring means and a preset target energization time; and feedback control means for correctively increasing and decreasing a welding current, which occurs at a next weld timing, on the basis of the time difference calculated by the time difference calculating means.

A fourth aspect of this invention is based on the third aspect of this invention, and provides a control apparatus wherein the time difference calculating means is operative for calculating the time difference on the basis of the target energization time which is preset in correspondence with each of welding points or each of welding machine types.

A fifth aspect of this invention provides a control apparatus for resistance welding which comprises time measuring means for measuring an energization time of a welding current, the energization time being required to generate a given amount of heat during welding between a terminal and a coated electric wire which are arranged between two electrodes, the terminal containing copper, the coated electric wire having an electric conductor coated with a film of resin; time difference calculating means for calculating a time difference between the energization time measured by the time measuring means and a preset target energization time; and feedback control means for correctively increasing and decreasing a welding current, which occurs at a next weld timing, on the basis of the time difference calculated by the time difference calculating means.

A sixth aspect of this invention provides a control apparatus for resistance welding which comprises first means for feeding a first welding current to a first portion to be welded, and then feeding a second welding current to a second portion to be welded; second means for detecting a period during which the first welding current remains fed by the first means; third means for detecting a difference between the period detected by the second means and a preset target period; and fourth means for controlling a magnitude of the second welding current in response to the difference detected by the third means.

DESCRIPTION OF THE PREFERRED EMBODIMENTS

First Embodiment

Figure 1:
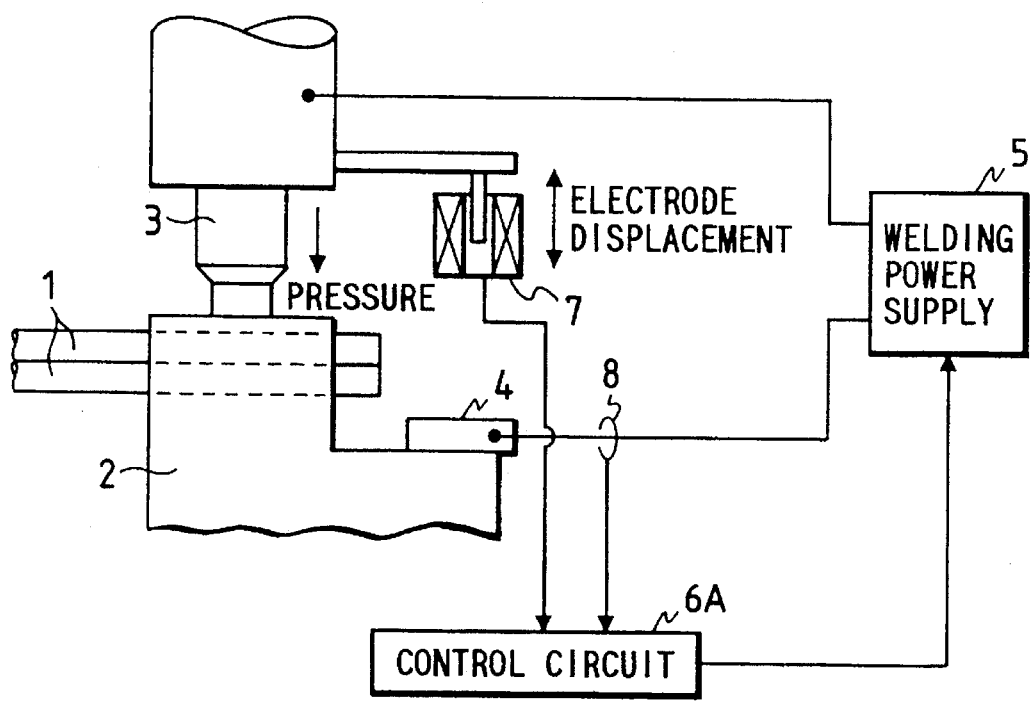
FIG. 1 is a diagram of a resistance welding system which contains a control apparatus according to a first embodiment of this invention.
Figure 2:
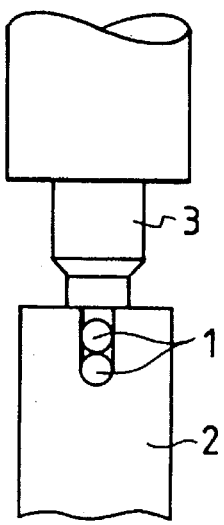
FIG. 2 is a side view of a portion of the resistance welding system in FIG. 1.

With reference to FIGS. 1 and 2, a resistance welding system serves to weld electric wires 1 to an electric terminal 2. The resistance welding system contains a control apparatus according to a first embodiment of this invention. The electric wires 1 include copper wires or copper alloy wires coated with films of insulating material such as polyester or resin. Ends of the electric wires 1 are placed on the electric terminal 2. Specifically, an upper portion of the electric terminal 2 has a groove through which the electric wires 1 extend. The electric terminal 2 is made of suitable metal such as copper or a copper alloy.

The resistance welding system includes an upper electrode 3 made of suitable metal such as tungsten, and a lower electrode 4 made of suitable metal such as a copper alloy. The upper electrode 3 can be moved or displaced vertically relative to the lower electrode 4 by a suitable drive mechanism (not shown). During operation of the resistance welding system, a tip or a lower end of the upper electrode 3 is forced into contact with upper surfaces of the electrode terminal 2 in a region directly above the electric wires 1. The lower electrode 4 is electrically connected to the electric terminal 2.

A welding power supply 5 has first and second output terminals, and a control terminal. The first and second output terminals of the welding power supply 5 are electrically connected to the upper electrode 3 and the lower electrode 4 respectively. The welding power supply 5 serves to feed a welding current to a welding part via the upper and lower electrodes 3 and 4.

A position sensor or a displacement sensor 7 is connected with the upper electrode 3. The sensor 7 detects the position or the displacement of the upper electrode 3, and outputs a signal representing the detected position or the detected displacement.

A current sensor 8 is associated with an electric line connecting the lower electrode 4 and the welding power supply 5. The current sensor 8 detects the presence and the absence of a welding current flowing along the electric line. The current sensor 8 also detects the level (the magnitude) of the welding current. The current sensor 8 outputs a signal representing whether a welding current is present or absent, and also representing the level (the magnitude) of the welding current.

A control circuit 6A is electrically connected to the control terminal of the welding power supply 5. The control circuit 6A is also electrically connected to the displacement sensor 7 and the current sensor 8. The control circuit 6A receives the output signal of the displacement sensor 7 which represents the position or the displacement of the upper electrode 3. The control circuit 6A also receives the output signal of the current sensor 8 which represents whether a welding current is present or absent, and which also represents the level of the welding current. The control circuit 6A generates a control signal in response to the output signals of the displacement sensor 7 and the current sensor 8. The control circuit 6A outputs the control signal to the control terminal of the welding power supply 5.

The welding power supply 5 includes a section for controlling the welding current. The control section is electrically connected to the control terminal. Therefore, the control section receives the control signal outputted from the control circuit 6A. The control section serves to control the welding current in response to the control signal.

Figure 3:
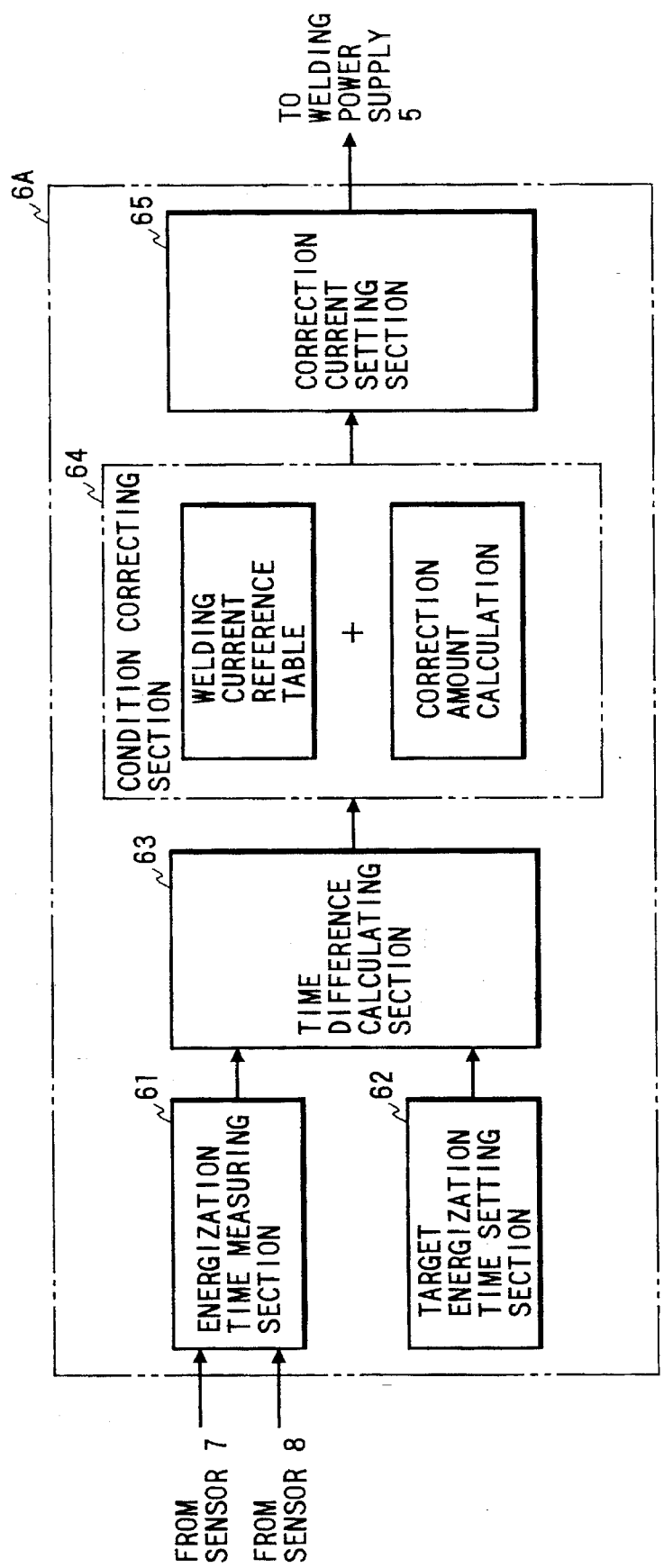
FIG. 3 is a diagram of a control circuit in FIG. 1.

As shown in FIG. 3, the control section 6A has sections 61, 62, 63, 64, and 65. The section 61 receives the output signals of the displacement sensor 7 and the current sensor 8. By referring to at least one of the output signals of the displacement sensor 7 and the current sensor 8, the section 61 measures an energization time equal to a period during which the welding current remains present. The section 61 is referred to as the energization time measuring section. The section 62 sets a target energization time (a command energization time). The section 62 is referred to as the target energization time setting section. The section 63 calculates the difference between the energization time measured by the energization time measuring section 61 and the target energization time set by the target energization time setting section 62. The section 63 is referred to as the time difference calculating section. The time difference calculating section 63 informs the section 64 of the calculated time difference between the measured energization time and the target energization time. The section 64 stores a plurality of preset reference welding current values. The section 64 selects one of the reference welding current values in response to the time difference between the measured energization time and the target energization time. The selected reference welding current value will be used in a next welding process. The section 64 is referred to as the condition correcting section. The condition correcting section 64 informs the section 65 of the selected reference welding current value. The section 65 sets or generates a control signal representing the selected reference welding current value. The section 65 is referred to as the correction current setting section. The control signal is transmitted from the correction current setting section 65 to the welding power supply 5 during a next welding process.

Figure 4:
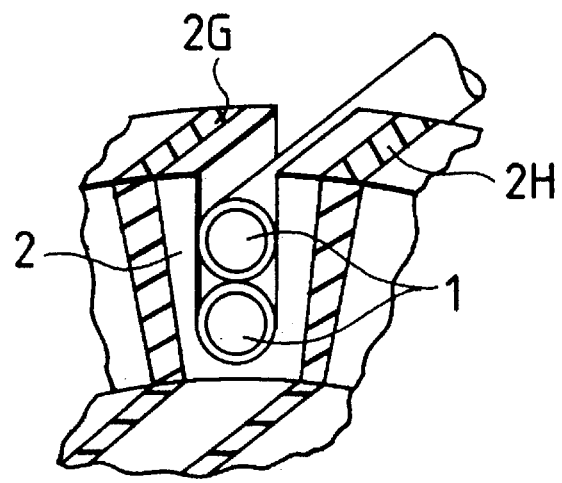
FIG. 4 is a perspective view of a first example of a combination of an electric terminal and coated electric wires to be welded together.

FIG. 4 shows a first example of the combination of an electric terminal and coated electric wires to be welded together. In this example, an electric terminal 2 of a joint-shape starter commutator has a groove in which ends of coated electric wires 1 are placed. The electric terminal 2 is electrically isolated by insulators 2G and 2H.

Figure 5:
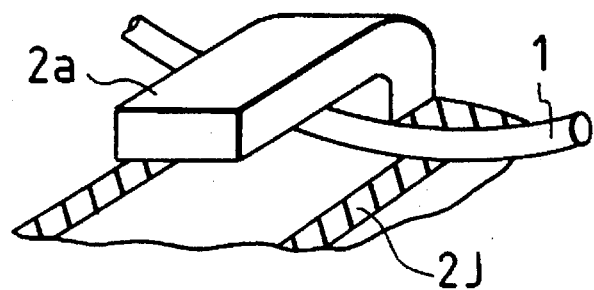
FIG. 5 is a perspective view of a second example of a combination of an electric terminal and a coated electric wire to be welded together.

FIG. 5 shows a second example of the combination of an electric terminal and a coated electric wire to be welded together. In this example, an electric terminal 2a has a bent portion defining a groove in which a part of a coated electric wire 1 is placed. The electric terminal 2a is electrically isolated by an insulator 2J.

A description will now be given of a sequence of resistance welding between an electric terminal 2 and coated electric wires 1 in FIG. 4. Sets each having an electric terminal 2 and coated electric wires 1 are sequentially fed to and placed in the resistance welding system of FIG. 1, and are sequentially subjected to welding processes thereby. Thus, a welding process is periodically reiterated. The resistance welding system generates information of desired control of the welding current during every welding process, and controls the welding current In response to the desired control information during a next welding process.

Figure 6:
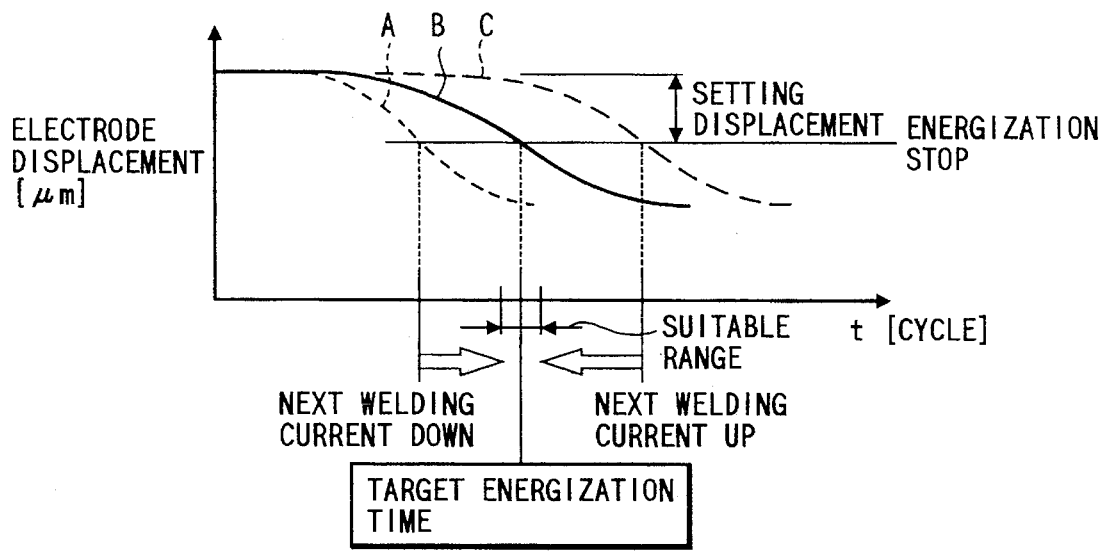
FIG. 6 is a diagram of the relation between an electrode displacement and an energization time.

Specifically, coated electric wires 1 and an electric terminal 2 are combined into a set as shown in FIG. 4, and are then placed in the resistance welding system of FIG. 1. The upper electrode 3 is displaced in accordance with a welding time "t" as shown in FIG. 6. The drive mechanism (not shown) presses the upper electrode 3 against the electric terminal 2 with a given welding force or pressure. As a main stage of a welding process is started and advanced, the electric terminal 2 and the electric wires 1 are deformed so that the upper electrode 3 is permitted to move. The welding time "t" is expressed in unit of cycle. In the case where the welding current agrees with an alternating current having a frequency of 60 Hz, one cycle corresponds to a time of about 16.7 ms.

With reference to FIG. 6, the feed of the welding current to the upper and lower electrodes 3 and 4 from the welding current supply 5 is interrupted when the upper electrode 3 has been moved by an mount equal to a setting displacement amount (a target displacement). In FIG. 6, "A", "B", and "C" denote different patterns of time-domain variations in the displacement of the upper electrode 3. The pattern "A" occurs in the case where the displacement of the upper electrode 3 reaches the setting displacement amount before a target energization time (a command energization time) elapses. In this case, the actual energization time is shorter than the target energization time. Such a shorter energization time is caused by a factor such as a disturbance. The pattern "B" occurs in the case where the displacement of the upper electrode 3 reaches the setting displacement amount when the target energization time elapses. In this case, the actual energization time is equal to the target energization time, and a good quality of resultant welded portions of the coated electric wires 1 and the electric terminal 2 is generally attained. The pattern "C" occurs in the case where the displacement of the upper electrode 3 reaches the setting displacement amount after the target energization time elapses. In this case, the actual energization time is longer than the target energization time. Such a longer energization time is caused by a factor such as a disturbance.

Figure 7:
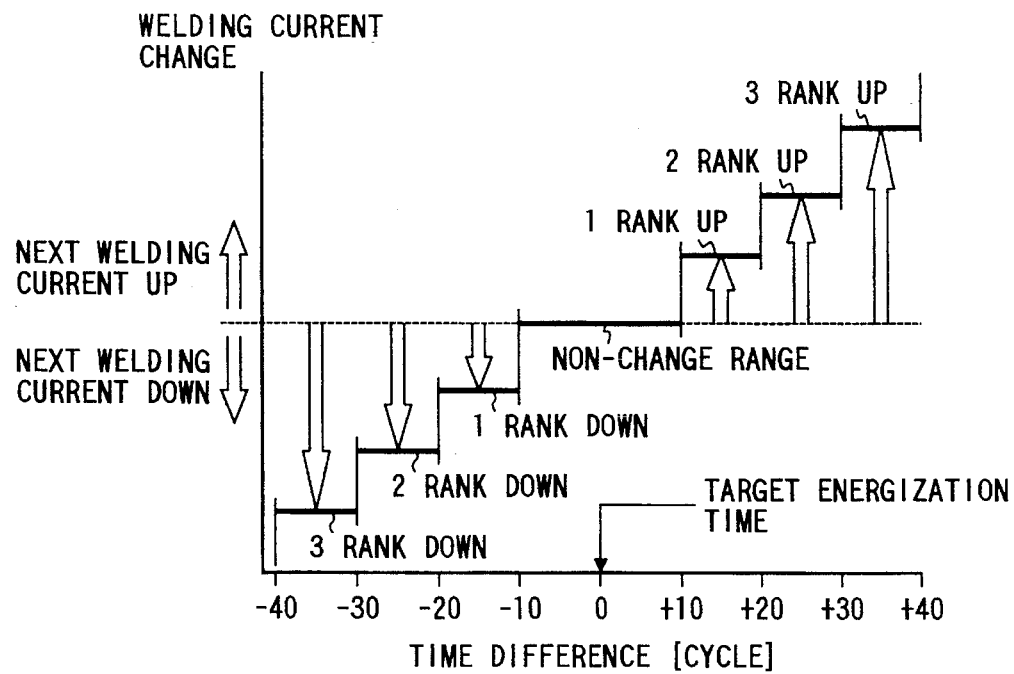
FIG. 7 is a diagram of the relation between a variation in a next welding current and the difference between a present energization time and a target energization time.

The target energization time setting section 62 sets a target energization time which is equal to the target energization time related to the pattern "B" in FIG. 6. As previously described, the pattern "B" corresponds to conditions where a good quality of resultant welded portions of the coated electric wires I and the electric terminal 2 is generally attained. During every welding process, the target energization time setting section 61 accepts the output signals of the displacement sensor 7 and the current sensor 8, and measures the actual energization time by referring to at least one of the output signals of the displacement sensor 7 and the current sensor 8. It should be noted that the actual energization time is defined as an elapsed time during which the welding current has been continuously present since the start of the feed thereof. The time difference calculating section 63 calculates the difference between the measured energization time and the target energization time which is equal to the measured energization time minus the target energization time. The calculated time difference is expressed in unit of cycle. The condition correcting section 64 determines an increase or a decrease in the welding current in accordance with the calculated time difference by referring to a predetermined function or relation as shown in FIG. 7. It should be noted that the increased or decreased welding current will be fed during a next welding process.

Figures 8, 9:
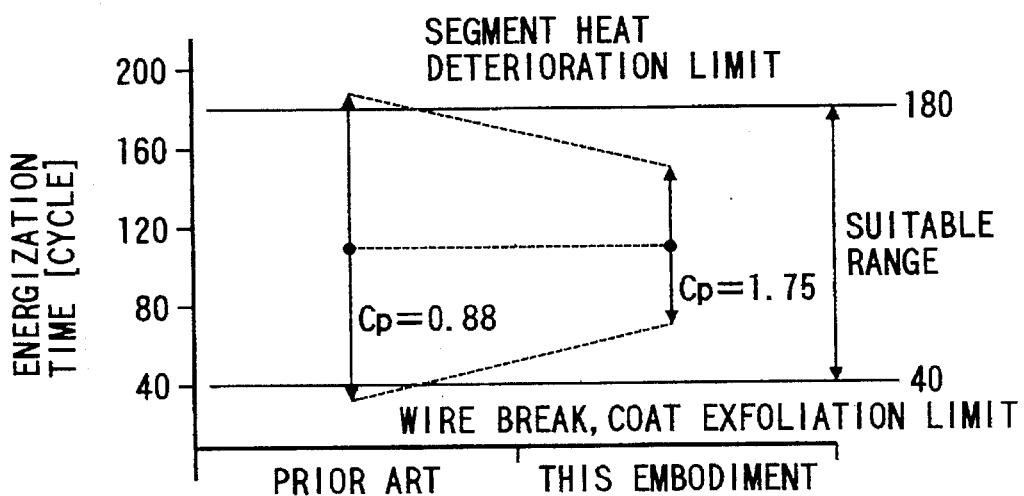
FIG. 8 is a diagram of the relation between a rank number and a welding current value.
FIG. 9 is a diagram of the relation among an energization time, a lower limit of segment heat deterioration, an upper limit of upper-wire break and coat exfoliation, and a step performance index Cp.

As shown in FIG. 8, fifteen different ranks denoted by numbers "1" to "15" are assigned to different welding current values of 2100 A, 2120 A, 2140 A, 2160 A, 2180 A, 2200 A, 2220 A, 2240 A, 2260 A, 2280 A, 2300 A 2320 A, 2340 A, 2360 A, and 2380 A respectively. The condition correcting section 64 selects one of the ranks in response to the calculated time difference.

When the calculated time difference is in the range of −10 to +10 cycles, the condition correcting section 64 does not change the currently selected rank so that the increase or the decrease in the welding current is set to zero. Thus, in this case, the present welding current value will also be used during a next welding process. When the calculated time difference is in the range of +10 to +20 cycles, the condition correcting section 64 selects the rank higher than the currently selected rank by one so that the welding current value is increased by one rank corresponding to 20 A. Thus, in this case, the welding current value used during a next welding process will be increased by one rank relative to the welding current value used during the present welding process. When the calculated time difference is in the rage of +20 to +30 cycles, the condition correcting section 64 selects the rank higher than the currently selected rank by two so that the welding current value is increased by two ranks corresponding to 40 A. Thus, in this case, the welding current value used during a next welding process will be increased by two ranks relative to the welding current value used during the present welding process. When the calculated time difference is in the range of +30 to +40 cycles, the condition correcting section 64 selects the rank higher than the currently selected rank by three so that the welding current value is increased by three ranks corresponding to 60 A. Thus, in this case, the welding current value used during a next welding process will be increased by three ranks relative to the welding current value used during the present welding process. When the calculated time difference is in the range of −10 to −20 cycles, the condition correcting section 64 selects the rank lower than the currently selected rank by one so that the welding current value is decreased by one rank corresponding to 20 A. Thus, in this case, the welding current value used during a next welding process will be decreased by one rank relative to the welding current value used during the present welding process. When the calculated time difference is in the range of −20 to −30 cycles, the condition correcting section 64 selects the rank lower than the currently selected rank by two so that the welding current value is decreased by two ranks corresponding to 40 A. Thus, in this case, the welding current value used during a next welding process will be decreased by two ranks relative to the welding current value used during the present welding process. When the calculated time difference is in the range of −30 to −40 cycles, the condition correcting section 64 selects the rank lower than the currently selected rank by three so that the welding current value is decreased by three ranks corresponding to 60 A. Thus, in this case, the welding current value used during a next welding process will be decreased by three ranks relative to the welding current value used during the present welding process.

The condition correcting section 64 informs the correction current setting section 65 of the selected welding current rank. The correction current setting section 65 sets information of the selected welding current rank, and generates a control signal representing the selected welding current rank. During the next welding process, the correcting current setting section 65 outputs the control signal to the welding power supply 5. In addition, the welding power supply 5 feeds the upper and lower electrodes 3 and 4 with a welding current having a level corresponding to the welding current rank represented by the control signal.

In such a way, during every welding process, the actual energization time is measured, and the difference between the actual energization time and the target energization time is calculated. The value of the welding current which will be used during a next welding process is increased or decreased in accordance with the calculated time difference. Specifically, the value of the welding current is increased and decreased as the actual energization time is longer and shorter than the target energization time respectively. Since a resultant energization time decreases as a welding current value increases, the actual energization time is feedback-controlled in an acceptable range or a suitable range around the target energization time (see FIG. 6).

The quality of a welding-resultant portion is closely related to an energization time. Generally, the quality of a welding-resultant portion tends to be good and poor as an energization time is in and outside a given range. According to this embodiment, the actual energization time is feedback-controlled in this given range so that the qualities of welding-resultant portions can be good.

In respect of fusing of a joint-shape starter commutator of FIG. 4, an energization time of 180 cycles corresponds to a lower limit of segment heat deterioration as shown in FIG. 9. In addition, an energization time of 40 cycles corresponds to an upper limit of upper-wire break and coat exfoliation as shown in FIG. 9. Accordingly, when the energization time is longer than 180 cycles, a wrong welding-resultant portion tends to be caused by segment heat deterioration. When the energization time is shorter than 40 cycles, a wrong welding-resultant portion tends to be caused by coat exfoliation or upper-wire break.

Figure 10:
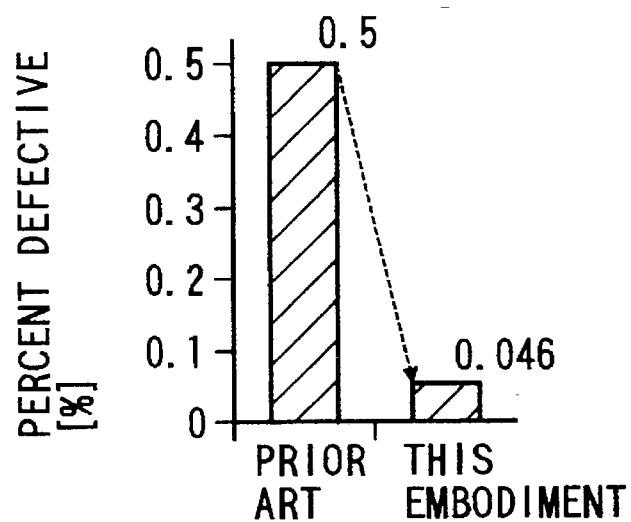
FIG. 10 is a diagram of a percent defective attained in this invention and a percent defective attained in an example of the prior art.

As previously described, in this embodiment, the actual energization time is held in the suitable range by the feedback control. Therefore, a step performance index Cp of 1.75 is attained with respect to the welding process as shown in FIG. 9. In addition, a percent defective of about 0.046% is attained with respect to the resistance welding as shown in FIG. 10.

On the other hand, in a prior art resistance welding system, an energization time tends to vary over a wide range. Therefore, in the prior art resistance welding system, a step performance index Cp with respect to a welding process is equal to 0.88 which is significantly smaller than the step performance index in the system of this embodiment (see FIG. 9). Furthermore, in the prior art resistance welding system, a percent defective with respect to resistance welding is equal to about 0.5% which is significantly higher than the percent defective in this embodiment.

The resistance-welding feedback control in this embodiment can also be applied to general welding such as spot welding.

In this embodiment, the electric terminal 2 is an electrically conductive weld base or member while the coated electric wires 1 are members to be welded to the electrically conductive weld base or member.

A plurality of resistance welding systems similar to the previously-described resistance welding system may be provided to implement welding processes on different members or in different positions. The previously-described resistance welding system may sequentially implement welding processes in different positions. In such cases, a target energization time in a resistance welding system is preferably chosen depending on the machine type of the system or the weld position for stably attaining a good quality of weld-resultant portions.

Figure 11:
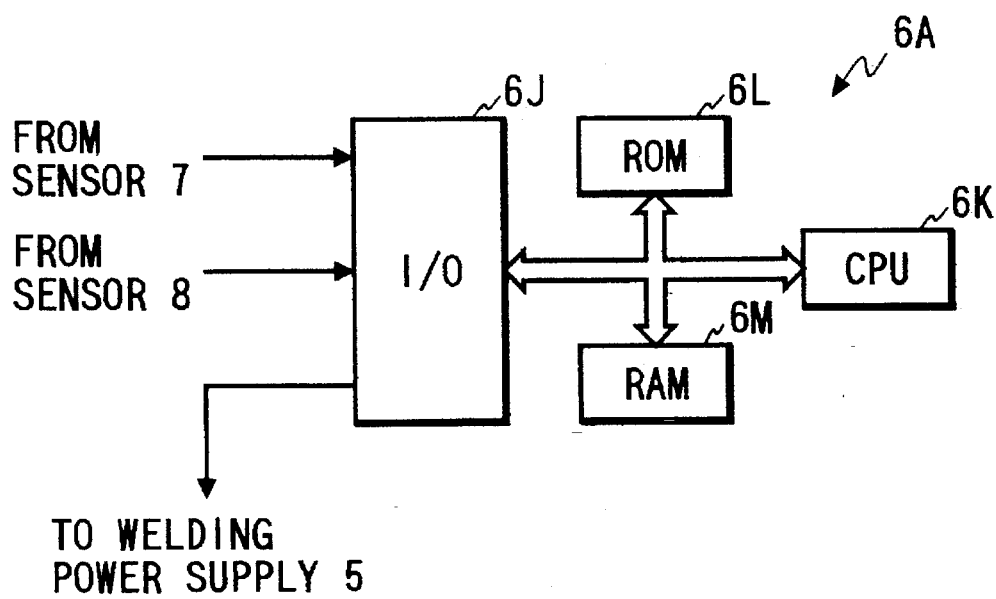
FIG. 11 is a block diagram of an example of the control circuit in FIG. 1.

With reference to FIG. 11, the control circuit 6A may include a microcomputer, a microprocessor, or a similar device having a combination of an I/O port 6J, a CPU 6K, a ROM 6L, and a RAM 6M. In this case, the control circuit 6A operates in accordance with a program previously stored in the ROM 6L.

Figure 12:
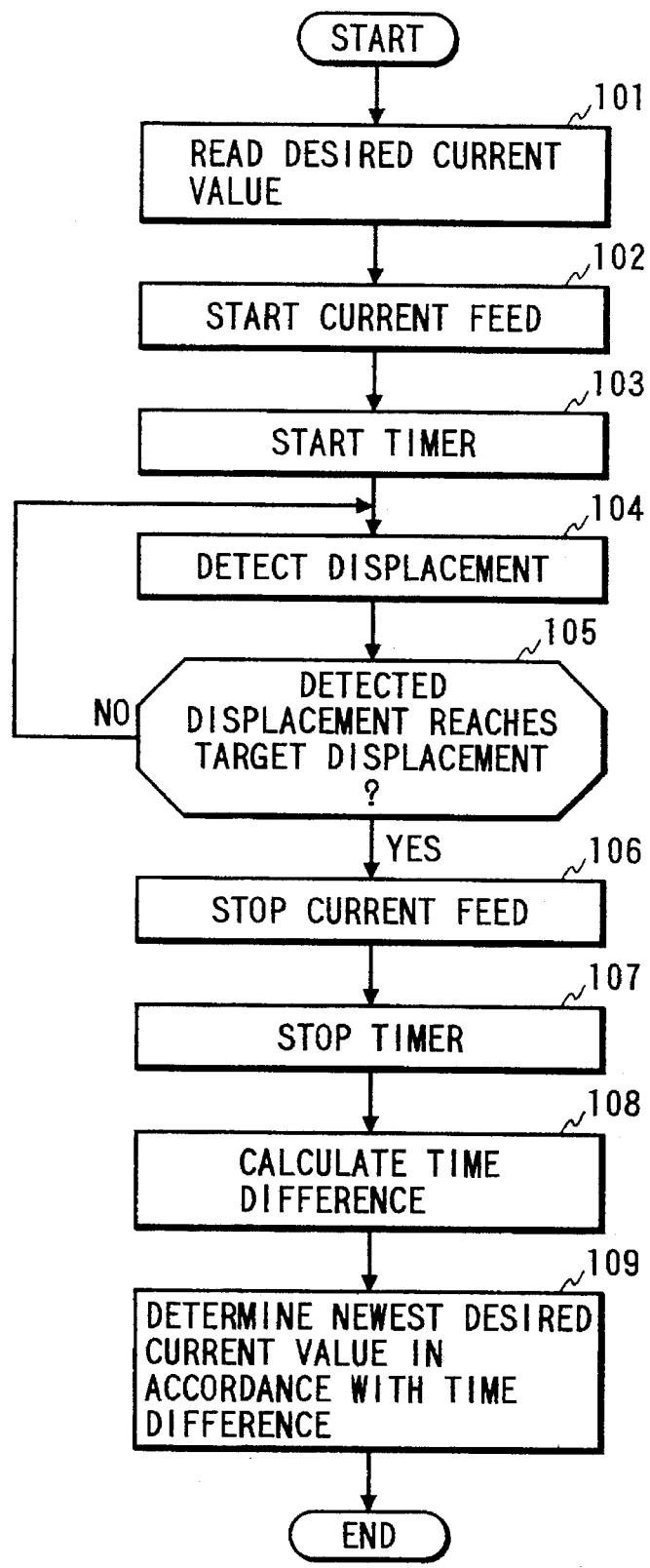
FIG. 12 is a flowchart of a segment of a program for operating the control circuit in FIG. 11.

FIG. 12 is a flowchart of a segment of the program which is executed for every welding process. Thus, the program segment in FIG. 12 is periodically reiterated.

As shown in FIG. 12, a first step 101 of the program segment reads out information of a desired current value from the RAM 6M. The desired current value is determined during the immediately preceding execution cycle of the program segment. In the case where the present execution cycle of the program segment agrees with a first execution cycle of the program segment, information of a preset initial current value is read out from the RAM 6M as the information of the desired current value.

A step 102 following the step 101 controls or activates the welding power supply 5 to start the feed of a welding current with a level corresponding to the desired current value given by the step 101.

A step 103 following the step 102 starts a timer, that is, starts measuring a time elapsed since the start of the feed of the welding current. The step 103 may start the timer in response to the output signal of the current sensor 8 which represents the appearance of the welding current. After the step 103, the program advances to a step 104.

The step 104 derives the present displacement of the upper electrode 3 by referring to the output signal of the displacement sensor 7.

A step 105 following the step 104 reads out information of a preset target displacement (a setting displacement amount) from the ROM 6L or the RAM 6M. The step 105 decides whether or not the present displacement of the upper electrode 3 reaches the target displacement. When the present displacement does not reach the target displacement, the program returns to the step 104. Accordingly, the steps 104 and 105 are reiterated until the present displacement reaches the target displacement. When the present displacement reaches the target displacement, the program advances from the step 105 to a step 106.

The step 106 controls or deactivates the welding power supply 5 to stop the feed of the welding current.

A step 107 following the step 106 stops the timer, that is, stops measuring the time elapsed since the start of the feed of the welding current. The step 107 may stop the timer in response to the output signal of the current sensor 8 which represents the disappearance of the welding current. In this way, the steps 103 and 107 cooperate to measure the interval of time during which the welding current remains fed, that is, cooperate to measure the energization time.

A step 108 following the step 107 reads out information of a preset target energization time from the ROM 6L or the RAM 6M. The step 108 calculates the difference between the measured energization time and the target energization time.

A step 109 following the step 108 determines a newest desired current value in accordance with the difference between the measured energization time and the target energization time. Specifically, the ROM 6L or the RAM 6M stores information of a plurality of preset reference welding current values. The step 109 reads out information of one of the reference welding current values from the ROM 6L or the RAM 6M in response to the difference between the measured energization time and the target energization time. Thus, the step 109 selects one of the reference welding current values in response to the difference between the measured energization time and the target energization time. The step 109 uses the selected reference welding current value as the newest desired current value, and updates the desired current value into the newest one. After the step 109, the present execution cycle of the program segment ends.

Second Embodiment

Figure 13:
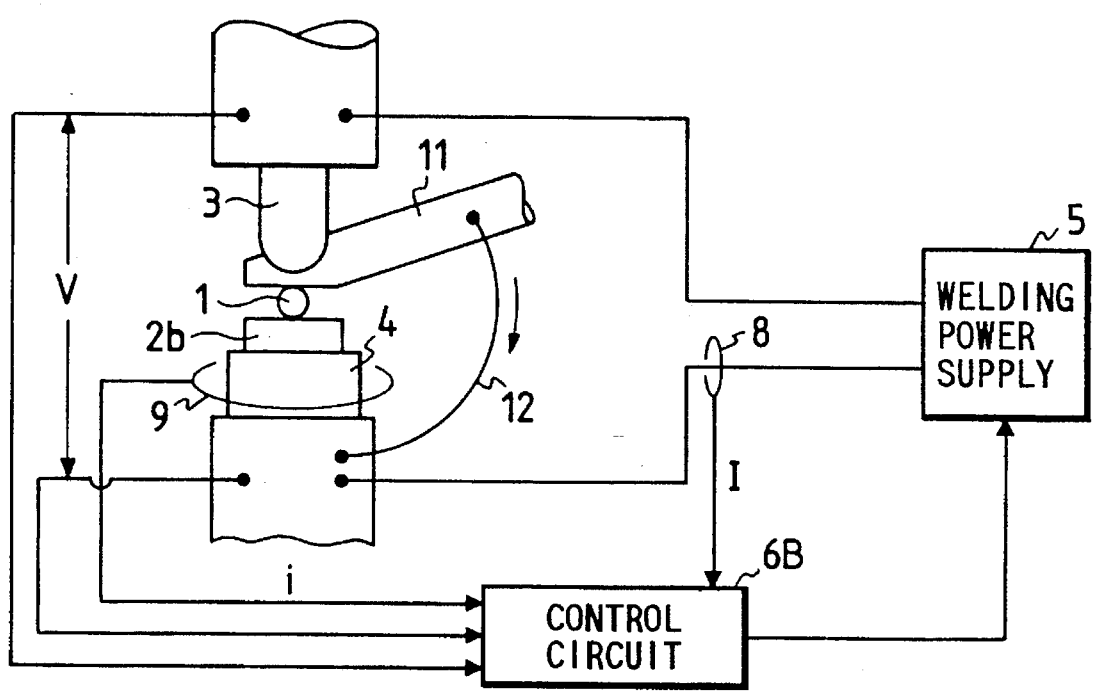
FIG. 13 is a diagram of a resistance welding system which contains a control apparatus according to a second embodiment of this invention.

FIG. 13 shows a second embodiment of this invention which is similar to the embodiment of FIGS. 1–12 except for design changes indicated hereinafter.

With reference to FIG. 13, a resistance welding system includes a control circuit 6B in place of the control circuit 6A (see FIG. 1). In addition, the resistance welding system includes an intermediate electrode 11 connected to circumferential outer surfaces of a lower end of an upper electrode 3 and a coated electric wire 1. The intermediate electrode 11 is electrically connected to a lower electrode 4 by a short-circuiting conductor 12.

The resistance welding system serves to weld the electric wire 1 to an electric terminal $2b$ placed on the lower electrode 4. A current sensor 9 associated with the lower electrode 4 detects a current "i" flowing through the coated electric wire 1 and the electric terminal $2b$ which is referred to as a weld-part current. A current detected by a current sensor 8 is referred to as a main current "I".

The control circuit 6B is electrically connected to the current sensors 8 and 9. The control circuit 6B receives the output signals of the current sensors 8 and 9 which represent the currents detected thereby.

The control circuit 6B is connected to the upper electrode 3 and the lower electrode 4 via electric lines (no reference characters). The control circuit 6B is informed by the electric lines of a voltage "V" developed between the upper electrode 3 and the lower electrode 4.

During an initial stage of a welding process, an electric path between the upper electrode 3 and the lower electrode 4 via the electric wire 1 is blocked by a coating film on the electric wire 1, and therefore the main current "I" flows between the upper electrode 3 and the lower electrode 4 via an electrical path including the intermediate electrode 11 and the short-circuiting conductor 12. As the coating film is exfoliated or separated from the body of the electric wire 1, there occurs an electric path between the upper electrode 3 and the lower electrode 4 via the electric wire 1 and the electric terminal $2b$ so that the weld-part current "i" starts to flow through the electric wire 1 and the electric terminal $2b$.

The current sensor 9 detects the weld-part current "i", and informs the control circuit 6B of the detected weld-part current "i". The electric lines provided among the control circuit 6B, the upper electrode 3, and the lower electrode 4 inform the control circuit 6B of the voltage "V" between the upper electrode 3 and the lower electrode 4.

Figure 14:
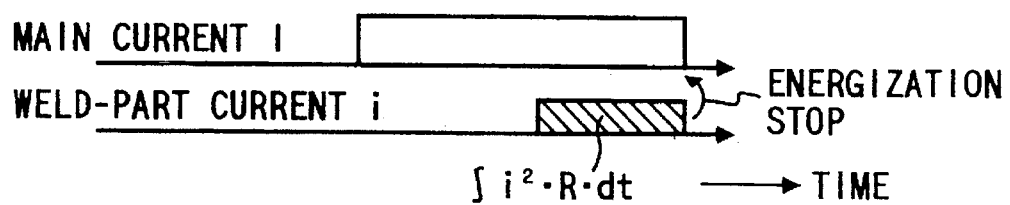
FIG. 14 is a time-domain diagram of a main current and a weld-part current in the resistance welding system of FIG. 13.

The control circuit 6B calculates the resistance "R" of the electrical path between the upper electrode 3 and the lower electrode 4 from the weld-part current "i" and the voltage "V". The control circuit 6B calculates the amount "Q" of heat applied to the welded portion by referring to the equation as "$Q=\int i^2 \cdot R dt$" or "$Q=i^2 \times R \times t$" where "t" denotes a time elapsed since the start of the presence of the weld-part current "i". The calculated heat amount corresponds to the area of a hatched region in FIG. 14.

The control circuit 6B compares the calculated heat amount with a preset desired heat amount (a preset target heat amount). When the calculated heat amount reaches the desired heat amount, the control circuit 6B controls or deactivates a welding power supply 5 to stop the feed of the welding current "I".

The control circuit 6B measures an energization time by referring to the output signal of the current sensor 9. The energization time is defined as a period during which the weld-part current "i" remains present. The control circuit 6B holds information of a preset target energization time (a preset command energization time). The control circuit 6B calculates the difference between the measured energization time and the target energization time. The control circuit 6B feedback-adjusts the level (the magnitude) of a welding current, which will be used in a next welding process, in response to the difference between the measured energization time and the target energization time as in the embodiment of FIGS. 1–12.

What is claimed is:

1. A control apparatus for resistance welding, comprising:

time measuring means for measuring an energization time of a welding current, the energization time being required by a given electrode displacement during welding between an electrical conductive weld member and a member to be welded which are arranged between two electrodes;

time difference calculating means for calculating a time difference between the energization time measured by the time measuring means and a preset target energization time; and feedback control means for correctively increasing and decreasing a welding current, which occurs at a next weld timing, on the basis of the time difference calculated by the time difference calculating means.

2. A method of controlling resistance welding, comprising:

a time measuring step of measuring an energization time of a welding current, the energization time being required by a given electrode displacement during welding between an electrical conductive weld member and a member to be welded which are arranged between two electrodes;

a time difference calculating step of calculating a time difference between the energization time measured by the time measuring step and a preset target energization time; and a feedback control step of correctively increasing and decreasing a welding current, which occurs at a next weld timing, on the basis of the time difference calculated by the time difference calculating step.

3. A control apparatus for resistance welding, comprising:

time measuring means for measuring an energization time of a welding current, the energization time being required by a given electrode displacement during welding between a terminal and a coated electric wire which are arranged between two electrodes, the terminal containing copper, the coated electric wire having an electric conductor coated with a film of resin;

time difference calculating means for calculating a time difference between the energization time measured by the time measuring means and a preset target energization time; and feedback control means for correctively increasing and decreasing a welding current, which occurs at a next weld timing, on the basis of the time difference calculated by the time difference calculating means.

4. The control apparatus of claim 3, wherein the time difference calculating means is operative for calculating the time difference on the basis of the target energization time which is preset in correspondence with each of welding points or each of welding machine types.

5. A control apparatus for resistance welding, comprising:

time measuring means for measuring an energization time of a welding current, the energization time being required to generate a given amount of heat during welding between a terminal and a coated electric wire which are arranged between two electrodes, the terminal containing copper, the coated electric wire having an electric conductor coated with a film of resin;

time difference calculating means for calculating a time difference between the energization time measured by the time measuring means and a preset target energization time; and feedback control means for correctively increasing and decreasing a welding current, which occurs at a next weld timing, on the basis of the time difference calculated by the time difference calculating means.

6. A control apparatus for resistance welding, comprising:

first means for feeding a first welding current to a first portion to be welded, and then feeding a second welding current to a second portion to be welded;

second means for detecting a period during which the first welding current remains fed by the first means;

third means for detecting a difference between the period detected by the second means and a preset target period; and fourth means for controlling a magnitude of the second welding current in response to the difference detected by the third means.

* * * * *